Sept. 8, 1964  W. E. PONEMON  3,148,314
CAPACITIVE PROBE
Original Filed July 15, 1957

STEP 1

STEP 2

STEP 3

STEP 4

CURING  STEP 5

STEP 6

STEP 7

STEP 8

STEP 9

INVENTOR.
WARREN PONEMON
BY
Leonard H. King
Attorney

United States Patent Office 3,148,314
Patented Sept. 8, 1964

3,148,314
CAPACITIVE PROBE
Warren E. Ponemon, Jamaica, N.Y., assignor to Koppers Company, Inc., a corporation of Delaware
Original application July 15, 1957, Ser. No. 671,835, now Patent No. 3,025,201, dated Mar. 13, 1962. Divided and this application Feb. 13, 1962, Ser. No. 176,843
7 Claims. (Cl. 317—246)

This invention relates to rigid electrically non-conductive members suitable for use as structural members and having embedded therein thin electrically conductive films.

In certain applications capacitive probes are utilized for sensing liquid level or the composition of a fluid existing between the probe electrodes. In general, such electrodes have in the past been formed of fairly substantial metal masses. In order to protect the metal and to prevent short circuiting of electrodes by electrically conductive fluids, it has been common practice to coat the electrodes with an insulating material such as a synthetic resin.

The use of such probes in capacitive fuel gaging equipment is disclosed for example in Leo A. Weiss Patent No. 2,789,435. Another application for such equipment has been in common carrier pipe lines utilized for transporting petroleum products. In such pipe lines it is necessary for the operators to determine when a change in the fluid passing through the line occurs so as to determine the beginning and end of a particular shipment. This is accomplished by sensing the change in dielectric constant as a new batch passes the check point.

The disadvantages of the prior art devices have included high weight, complexity and resulting high manufacturing cost, bulkiness and other disadvantages.

There is disclosed hereinafter an improved sensing device which utilizes a thin metal film encapsulated in a reinforced synthetic resin body. The devices of this invention has many other advantages, as for example, light weight. They may be employed as structural elements, such as a supporting rib for an aircraft wing and at the same time as a sensing capacitor. As will be disclosed hereinafter, they are readily and inexpensively produced. The devices of this invention permit the use of smaller quantities of metal than heretofore required in prior art sensing capacitors, which is an important asset during times of national emergency when metals are normally in short supply.

It is an object of this invention to provide a lightweight capacitive probe.

Still another object of this invention is to provide an improved electrically non-conductive structural member having incorporated therein a thin electrically conductive element supported by the structural member.

A further object of this invention is to provide a novel capacitive sensing probe suitable for use in pipe lines.

Still another object of this invention is to provide an improved capacitive probe suitable for use in capacitive type liquid quantity measuring systems.

Still other objects and advantages of this invention will be in part obvious and in part pointed out with particularity as the following description proceeds taken in conjunction with the accompanying drawings.

Figure 3:
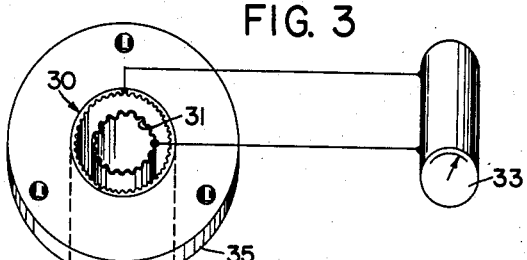

FIGURE 3 discloses pictorially and partially schematically a liquid level sensing device employing the product of this invention.

Figure 4:
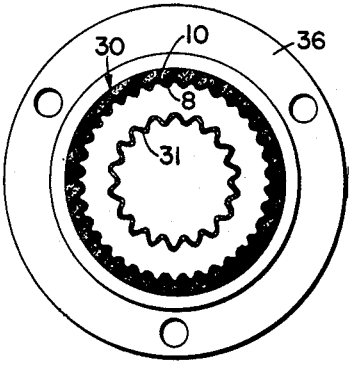

FIGURE 4 is a cross sectional view taken through 4—4 of FIGURE 3.

Figure 5:
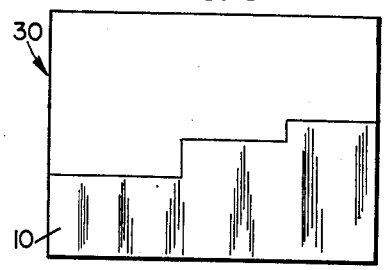

FIGURE 5 is a developed view, of the interior, of the outer tube shown in FIGURE 3.

Figure 6:
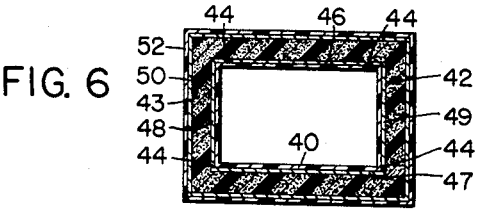

FIGURE 6 is a cross-sectional view of a preferred liquid level sensing probe.

Figure 1:
FIGURE 1 is a process sheet showing various steps.
Figure 1:
Figure 1:
Figure 1:
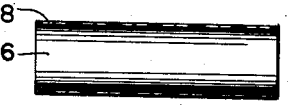
Figure 1:
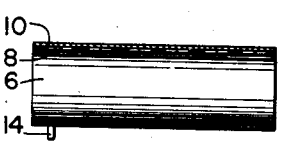
Figure 1:
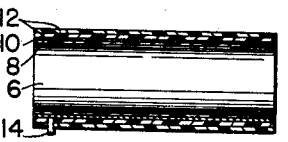
Figure 1:
Figure 1:
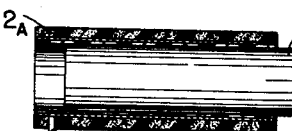

The process of manufacture is shown carried out step by step in FIGURE 1 and is fully described in parent application for Electrically Non-Conductive Structural Element Containing Embedded Film, Serial No. 671,835, filed July 15, 1957 and now U.S. Patent No. 3,025,201, of which this is a divisional application. The instant application pertains only to the product formed by the process disclosed in my aforementioned U.S. Patent.

*Step 1.*—There is shown a master mandrel 2, conforming in outside shape to the inner surface of a desired hollow element. The master mandrel 2 is formed of wood, metal or other conveniently worked material.

*Step 2.*—Master mandrel 2 is then copied as a female master mold 4, using plaster, plastic, or any of the other suitable conventional mold making materials commonly employed for this purpose, by casting the mold making material around the master mandrel 2.

*Step 3.*—Into the master mold 4 there is then cast a mandrel 6, utilizing a low melting point material such as Woods Metal or a thermoplastic resin such as polystyrene. Step 3 shows meltable mandrel 6 removed.

*Step 4.*—Meltable mandrel 6, resulting from step 3, is then coated with a layer of synthetic resin 8.

*Step 5.*—Although not essential, it is preferred that the layer of resin be cured at the normal curing temperatures for such resin. In many cases setting at room temperature to a tacky condition is adequate. If epoxy resins are employed bringing the resin to a "B" stage is advantageous.

*Step 6.*—A layer of metal 10, in the desired configuration, is deposited on coating 8 by means of silk screening techniques, use of decals, electroplating or by the use of a pressure sensitive adhesive foil layer (if the resin layer is tacky then untreated metal foil will adhere).

*Step 7.*—Tubes of woven glass fiber 12 are now stretched over the coated mandrel. A sufficient number of such tubes or sleeve-like woven tubular members are stretched over the mandrel in concentric layers so as to provide a layer of the thickness required.

*Step 8.*—The layers of glass fiber (or other suitable reinforcing fiber) are then impregnated with epoxy resin, forming homogeneous body 12a.

*Step 9.*—The impregnated body 12a is then cured in an oven at the normal curing temperature for the epoxy or other resin employed.

The procedure of steps 7 through 9 is described and claimed in my copending application entitled "Reinforced Member," Serial No. 611,050, filed approximately September 20, 1956, now abandoned.

Prior to impregnation, terminal member 14 may be attached to the metal layer 10 and positioned so that in subsequent steps the terminal is encapsulated by synthetic resin and permanently fixed in position.

In a final step, Step 10, the meltable mandrel is removed by heating to the melting point so as to provide a hollow structure.

Figure 2:
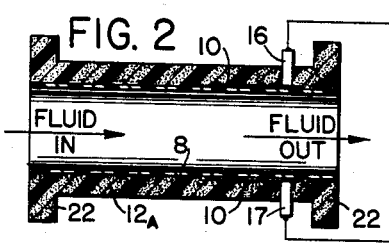
FIGURE 2 shows partially broken away the novel device of this invention embodied in a pipe line sensing element.

In FIGURE 2 there is shown in cross section an element suitable for insertion in a pipe line. This element consists of tubular body 12a having embedded therein thin metallic plates 10. Terminals 16 and 17 provide means for connecting the two plates to external circuit 18 which consists of a capacitance bridge, amplifier 19, and indicating means 20. Variations in dielectric constants of fluids passing through the pipe line cause a change in the reading of indicator 20. In place of indicator 20 conventional relay and/or automatic control devices may be employed.

A common pipe line transports a variety of fluids in order to enable operating personnel to segregate individual shipments of fluids and a sensing and indicating device is necessary. The apparatus disclosed herein is advantageous for this purpose because the sensing probes are an integral part of the pipe line and are not subject to damage. Flanges 22 permit coupling of the special sensing section into the pipe line.

In FIGURE 3 there is shown pictorially an improved sensing device suitable for use in capacitive type liquid level measuring systems. In such systems variations in the level of the liquid between the electrodes 30 and 31 while partially immersed in a liquid results in a change in dielectric constant of the medium between the two electrodes 30 and 31. In turn this change is sensed by indicator 33. The dielectric constant of the medium changes since a substantial difference exists between the dielectric constant of liquids commonly employed and that of air. In order that such a system be responsive to changes in quantity rather than changes in level particularly where employed in combination with a tank of varying cross section as is commonly found aircraft, it is common practice in the industry to "characterize" the shape of the capacitive plates in order to compensate for such variations in the cross section of the tank. In general, it is desirable to have a high running capacitance, per unit length. The process lends itself to the formation of the complex corrugated shape shown in FIGURE 4 which provides a high cross sectional area of electrode in a small size. In addition to the corrugated shape, the device may incorporate the aforementioned characterized shape as shown in FIGURE 5, which is a development of the inner surface of the outer tube 30. The embedded thin sheet of metal 10 may be observed to have an area which varies in accordance with a particular function. Inner tube 31 may be an aluminum extrusion or metallized plastic. As discussed in connection with the embodiment of the invention employable in a pipe line, terminal members may be integrally molded into the body.

Despite the light weight of this structure, it has highly desirable structural properties and is extremely rigid. Suitable flanges 35 and 36 may be formed at the time of molding so as to provide means for combining the member into a structure such as a wing of an aircraft wherein it may serve the dual function of sensing probe and structural member. While the process has been described in terms of a meltable mandrel, it is to be understood that using suitable mold release agents a conventional non-meltable mandrel may be used.

The thickness of the resin layer 8 will be determined by the intended application of the device. In a level indicator for a fuel gage, where little or no wear is to be expected, a few thousandths of an inch is adequate. In a pipe line a quarter-inch layer may be deposited.

A preferred capacitive sensing electrode for purposes of liquid quantity measurement is shown in FIGURE 6. This electrode may be made by coating a rectangular mandrel with a thin layer of epoxy resin 40 and partially polymerizing said resin to the "H" stage. The resin is then metallized by the chemical or vacuum deposition of copper, silver, gold, nickel or other appropriate metal. As an alternative the resin may be coated with graphite and then electroplated as is conventional in the recording art.

The layer 42 is then electroplated to increase its thickness. Copper is a preferred metal for this purpose. Grooves 44 are cut through the copper layer 42 so as to isolate sections 46, 47, 48 and 49 from each other. The grooves are preferably formed by photo-chemical etching techniques. This method may be used to provide a shaped patter nas is required for a "characterized capacitor." A plurality of concentric layers of woven fibre glass tubing is then stretched over the mandrel. Epoxy resin is then impregnated into the interstices of the glass fibres to form a monolithic structure 43.

Suitable connectors (not shown) which may be integrally molded into the structure, make contact with metal sections 46, 47, 48 and 49 and permit connection to external circuits. Metal sections 46 and 47 are the electrodes forming the capacitor. Section 46 is connected, in appropriate circuits, to a point of high impedance (with respect to ground). Section 47 is normally connected to a point of low impedance.

It is preferred that an electrostatic shield be formed on the outside of the capacitor. This may be a chemically deposited layer of metal 50. Optionally, a protective coating of epoxy resin 52 may be deposited over layer 50.

The sensing electrode just described has many advantages over the prior art devices such as low cost, light weight and compact configuration. A most important advantage is that a one piece article results thus eliminating parts which can loosen under vibration or become misaligned.

In still another embodiment of the invention a highly polished steel mandrel is coated with graphite powder which serves as an electrically conductive mold release agent. A layer of metal is then electroplated onto the graphite. Copper is a suitable metal for this purpose. The metal plate is then etched to provide the desired pattern. Conventional photo-chemical etching methods may be employed. The metal layer is then covered by a reinforced fiber, preferably in woven form. The fiber is then impregnated with resin as discussed earlier.

It is to be noted in this last embodiment that the mandrel was not precoated with resin. Instead of the chemical deposition and etching procedure, suitable shaped metal foil pieces may be placed onto the mandrel and then encapsulated as taught herein.

Having thus described the best embodiment of my invention presently contemplated, it should be understood that various changes may be made by those skilled in the art upon consideration of this disclosure without departing from the spirit of the invention.

What is claimed is:

1. An improved sensing capacitor for sensing a movable liquid dielectric medium comprising:
   a hollow reinformed synthetic resin body characterized by a corrugated interior configuration, said hollow body having a rigid wall;
   a thin, continuous, single surfaced electrically conductive layer encapsulated in said body and constituting a corrugated tubular electrode following the contour of the interior configuration of said body, and which is covered by a layer of synthetic resin, said tubular electrode having opposed open ends, whereby a movable liquid dielectric medium is adapted to flow axially therethrough; and
   an electrically conductive means connected to said conductive layer for making connection to said conductive layer from an external point.

2. A capacitor for sensing a movable liquid dielectric medium comprising:
   a hollow reinforced synthetic resin supporting member characterized by a corrugated interior configuration, said supporting member having a rigid wall;
   a thin, continuous, single surfaced electrically conductive layer encapsulated in said supporting member and following the corrugated contour so as to form a substantially tubular corrugated electrode, said tubular electrode having opposed open ends, whereby a movable liquid dielectric medium is adapted to flow axially therethrough; and
   electrically conductive means connected to said conductive layer for making connection to said conductive layer from an external point.

3. An in-line sensing unit for a pipeline comprising:
   a hollow, rigid walled reinforced synthetic resin body adapted for use in a movable liquid dielectric medium, said body having encapsulated therein a pair of opposed electrically conductive inserts adapted to function as electrodes, the inserts being disposed proximate the inside surface of said hollow body on opposite sides of the opening through said body, said hollow body being further characterized by a pair of opposed open ends defined by the inside surface of said hollow body whereby a movable liquid dielectric medium is adapted to flow axially therethrough;

a pair of axially spaced transversely disposed flange members integral with said hollow body, each of said flanges being proximate one of said open ends for securing said unit in a pipeline; and conductive means connected to said electrodes for making electrical connection to external circuits.

4. An improved sensing capacitor adapted for use in a movable liquid dielectric medium, said capacitor comprising a hollow rigid walled, reinforced synthetic resin body characterized by a rectangular interior configuration, a pair of thin electrically conductive layers encapsulated in opposed walls of said interior of said body so as to form a pair of substantially flat electrodes, said hollow body being further characterized by a pair of opposed open ends whereby a movable liquid dielectric medium is adapted to flow therethrough and electrically conductive means for making connection to said conductive layers from an external point.

5. The capacitor of claim 4 wherein said body is surrounded by an electrically conductive shield applied to said body.

6. An improved sensing capacitor adapted for use in a movable liquid dielectric medium, said capacitor comprising a hollow rigid walled, reinforced synthetic resin body having a pair of opposed open ends to form a passageway therethrough, said passageway being adapted to receive a movable liquid dielectric medium, said body being characterized by a rectangular interior configuration, two pairs of thin electrically conductive layers encapsulated in the interior of said body so as to form two sets of opposed electrodes and electrically conductive means for making connection to said conductive layers from an external point.

7. The capacitor of claim 6 including a metal shield encasing the exterior surface of said body.

References Cited in the file of this patent

UNITED STATES PATENTS

| | | |
|---|---|---|
| 2,318,935 | Fisher | May 11, 1943 |
| 2,331,624 | Parr | Oct. 12, 1943 |
| 2,688,177 | Wagner | Sept. 7, 1954 |
| 2,935,669 | Abeel | May 3, 1960 |
| 2,950,426 | Frome | Aug. 23, 1960 |

FOREIGN PATENTS

| | | |
|---|---|---|
| 493,070 | Great Britain | Oct. 3, 1938 |